United States Patent Office 3,481,924
Patented Dec. 2, 1969

3,481,924
3-(2'-S-TETRAHYDROPYRANYL ETHERS) OF ESTRA-1,3,5(10)-TRIENES
Pietro de Ruggeri, Carmelo Gandolfi, and Umberto Guzzi, Milan, Italy, assignors to Ormonoterapia Richter S.p.A., Milan, Italy, an Italian corporation
No Drawing. Filed Dec. 5, 1966, Ser. No. 598,930
Claims priority, application Italy, Oct. 3, 1966, 28,437/66
Int. Cl. C07c *173/00;* A61k *17/00*
U.S. Cl. 260—239.55       18 Claims

ABSTRACT OF THE DISCLOSURE 3-(2' - S - tetrahydropyranyloxy)-estra-1,3,5(10)-triene β-anomers are provided in substantially pure form and substantially free from 3 - (2'-R-tetrahydropyranyloxy)-estra-1,3,5(10)-triene α-anomers. The β-anomers have prominent lipodiattic activity.

---

This invention relates to novel compounds of the formula:

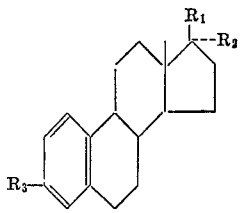

wherein:

R₁ is hydroxy, acyloxy, tetrahydropyranyloxy and wherein the acyl radical in the acyloxy group may be derived from carboxylic acids which are aliphatic, cycloaliphatic, aromatic or araliphatic. Useful aliphatic carboxylic acids include saturated acids having from 1 to 12 carbon atoms. Cyclopentyl- and cyclohexyl-propionic acid are illustrative of the cycloaliphatic acids which may be employed. Benzoic acid or an acyl radical derived from a phenyl, p-amino-phenyl or p- or o-hydroxyphenyl nucleus may be employed. Phenylacetic, phenylpropionic, phenylcinnamic or phenylpropiolic acids are illustrative of the araliphatic carboxylic acids employed. Dicarboxylic acids such as succinic and glutaric are within the scope of the disclosure.

R₂ is hydrogen, methyl, ethyl, vinyl or ethynyl, or R₁ and R₂ together are keto-; and R₃ is 2'-tetrahydropyranyloxy of the formula:

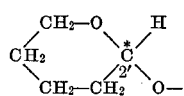

the particular space disposition of the

*ĊH and Ċ—O— bonds around the asymmetric C* atom, is such that, the compounds of this invention of the formula:

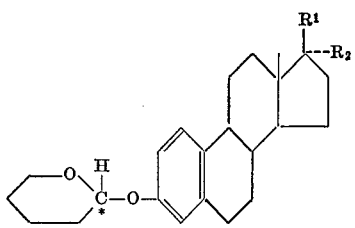

correspond, as between the two diastereo-isomers, to the diastereo isomer which has the less dextrorotatory optical power and as determined, by means of optical rotatory dispersion (ORD) attributed to it, the absolute 2'-S configuration. Since the hemiacetal bond of the compounds of this invention is similar to the bond of the β-D-glucopyranoside anomer, the compounds of this invention are here referred to as β-anomers.

As known from organic chemistry, when, a phenol or an alcohol (R—OH) is reacted with dihydropyran to obtain the corresponding tetrahydropyranyl ether, and the starting compound (alcohol or phenol) contains some asymmetric C atoms, the reaction product will be a mixture of two tetrahydropranyl ethers which are not optical antipodes, but diastereo-isomers:

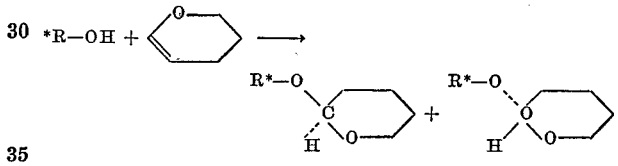

Frequently, in the case of steroids, these diastereo-isomers have slightly different melting-points and exhibit significant differences in specific rotatory power. One can separate the more dextrorotatory anomer from the less dextrorotatory anomer. Thus, in the case of 3,2'-tetrahydropyranyl ethers of estra-1,3,5(10)-trienes, the mixture of the two diastereo-isomers has been separated into the two component anomers, a less dextrorotatory anomer (β-anomer), to which, on the basis of measurement of optical rotatory dispersion, the absolute 2'-S configuration has been attributed:

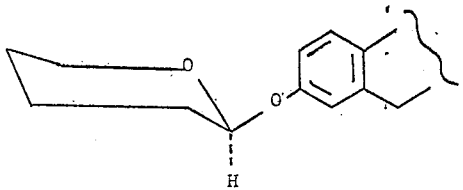

and the more dextrorotatory anomer (α-anomer), to which corresponds the absolute 2'-R configuration:

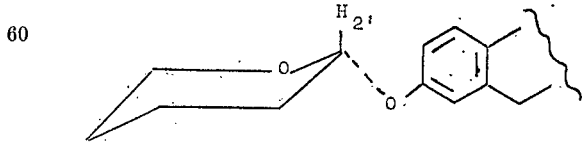

Therefore, the compounds of this invention can be given the following formula:

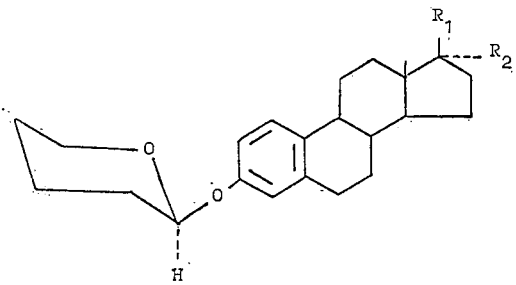

The mixture of the two diastereo-isomers (that is of diastereoisomers 2'-R and 2'-S) is obtained by reacting 3-phenolsteroids with 2,3-dihydropyran in the presence of an acid catalyst.

The β-anomer compounds, that is the less dextrorotatory ones, as obtained by separating the mixture of the two diastereo-isomers (mixture of α and β anomers), exhibit prominent pharmacological activities, which distinguish them from the more dextrorotatory diastereoisomers (α-anomers) which, on the basis of the preceding convention, will be represented as follows:

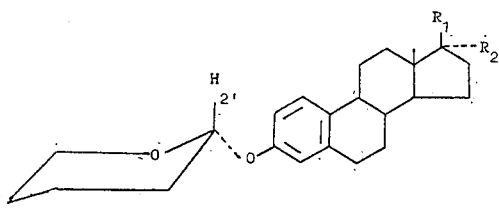

For example, in the case of 3-(2'-tetrahydropyranyloxy) estra-1,3,5(10)triene-17 β-ol (estradiol-3-pyranyl), the β-anomer, i.e. 3 - (2'-S-tetrahydropyranyloxy)-estra-1,3,5 (10)-triene-17β-ol (estradiol-3-pyranyl), that is, of the two diastereo-isomers, the less dextrorotatory form, having a negative Cotton effect, exhibits, when administered by mouth, a complete lack of estrogenic activity, a deficient hypophysis-inhibiting activity, but a prominent lipodiattic activity (decrease of blood cholesterol, modification of the α,β-lipoprotein picture) while the α-anomer that is, of the two diastereo-isomers, the more dextrorotatory form, having a positive Cotton effect in ORD, exhibits an opposite picture of moderate estrogenic activity, best anti-ovulatory activity, deficient lipodiattic activity.

This difference in the pharmacological activity can be related to the different space position of the 2'-tetrahydropyranyloxy substituent in relation to the plane of the steroid molecule, and therefore, it may favour or inhibit the linking of the new steroid molecule to the enzymic system which is responsible for the biological activity.

Therefore, the separation of the mixture of the two diastereo-isomers of tetrahydropyranyl ethers of estrogenic steroids into the two components α- and β-anomers, takes a particular significance since only the β-anomer (i.e. the pure diastereo-isomeric form having a lower dextrorotatory power and a negative Cotton effect) exhibits a prominent lipodiattic activity.

The preparation can take place by separating the mixture of the α- and β-anomers by means of physical methods (fractionated crystallization, gas-chromatography, column chromatography, preparative chromatography on a thin layer) or by starting from the β-anomer and subjecting the latter to successive reactions.

Thus, for example, by reducing estrone 3-(2'-S-tetrahydropyranyloxy) (that is, of the two diastereo-isomers, the less dextrorotatory form -2'-S-), with NaBH₄ or LiAlH₄ or with an alcohol and sodium estradiol 3-(2'-S-tetrahydropyranyloxy), is obtained. This compound may be oxidized with pyridine-CrO₃, to obtain estrone-3-(2'-S-tetrahydropyranyloxy).

The ethynylation of the latter compound results in the production of 17α-ethynyl-estradiol-3-(2'-S-tetrahydropyranyloxy). The 17α-ethynyl substituent of this compound may be totally or partially reduced to produce 17α-ethyl or 17α-vinyl-estradiol-3-(2'-S-tetrahydropyranyloxy).

Thus, estradiol-3-(2'-S-tetrahydropyranyloxy), that is, the less dextrorotatory form of the two diastereo-isomers, having a negative Cotton effect, may be reacted with acid anhydrides or acid chlorides to obtain estradiol-3-(2'-S-tetrahydropyranyloxy)-17β-acyloxy compounds. However, reaction with 2,3-dihydropyran results in the mixture of the two 17β-diastereo-isomers of estradiol-bis-[3(2'-S-), 17-(2''-R and S)-tetrahydropyranyloxy], which can be separated to give estra-1,3,5(10)-triene-3-(2'-S-tetrahydropyranyloxy)-17β(2''-R-tetrahydropyranyloxy) (I) and estra - 1,3,5(10)-triene-3(2'-S-tetrahydropyranyloxy)17β-(2''-S-tetrahydropyranyloxy) (II):

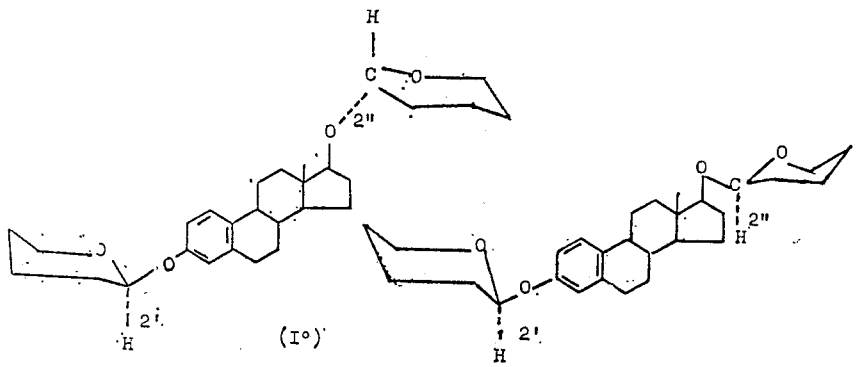

EXAMPLE 1

3-(2'-S-tetrahydropyranyloxy)-estra-1,3,5(10)-triene-17β-ol 2 parts phosphorus oxychloride is added to a suspension of 100 parts estra-1,3,5(10)-triene-3-ol-17-one in 400 parts 2,3-dihydropyran, under stirring and while cooling the reaction mixture with ice water. After 15 minutes the suspension is warmed gradually to 60° C., while excluding moisture from the reaction vessel, to obtain a complete dissolution of the steroid.

The reaction mixture is cooled to 20° C. and held at this temperature for 20 hours. After neutralization with a solution of sodium methylate in methanol, it is evaporated under vacuum to dryness, the residue is dissolved in 200 parts methanol and 400 parts dioxane, and then 35 parts sodium borohydride is added slowly and with stirring. The resulting mixture is refluxed for 3 hours, concentrated under vacuum to half volume, and diluted with water.

The precipitate, which is formed, is collected by means of filtration and 125 parts 3-(2'-tetrahydropyranyloxy)-estra-1,3,5(10)-triene-17β-ol, a mixture of the two diastereo-isomers (α- and β-anomer), is obtained. This product is dissolved in 4000 parts ethyl ether and the solution is successively concentrated to 3500 parts, 2500, 2000 and 1000 parts. The solids, which crystallized every time by spontaneous separation from the mixture, are collected (55 parts) and recrystallized from 2000 parts ethyl ether. Solids precipitating from the solution concentrated to 1500, 1000, 750, 500 ml. are collected and then recrystallized from methanol to give 38 parts pure 3-(2'-S-tetrahydropyranyloxy)-estra - 1,3,5(10) - triene - 17β - ol, M.P. 154.5–156° C.; $[\alpha]_D = -26°$ (c.=1% in $CHCl_3$). Cotton effect, negative in ORD.

EXAMPLE 2

3-(2'-S-tetrahydropyranyloxy)estra-1,3,5(10)-triene - 17-one

A solution of 20 parts 3-(2'-S-tetrahydropyranyloxy)-estra-1,3,5(10)-17β-ol (M.P. 154.5–156° C.; $[\alpha] = -26°$ ($CHCl_3$)) is added to a suspension of 20 parts chromic anhydride in 200 parts pyridine and the resulting solution is held overnight at room temperature. It is diluted with water; the precipitate, which is formed, is filtered out, dried on a water bath and crystallized from ethyl ether to give 16.4 parts 3-(2'-S-tetrahydropyranyloxy)-estra-1,3,5 (10)-triene-17-one, M.P. 156–158° C.; $[\alpha]_D = +35°$ (c.=1% in $CHCl_3$). Cotton effect, negative in ORD.

EXAMPLE 3

3-(2'-S-tetrahydropyranyloxy)-estra-1,3,5(10)-triene-17β-ol

A solution of 1 part 3-(2'-S-tetrahydropyranyloxy) estra-1,3,5(10)-triene-17-one (M.P. 156–158° C.; $[\alpha]_D = +38°$, (c.=1% in $CHCl_3$) is dissolved in 3.6 parts dioxane and 1.5 parts methanol and combined with 0.2 part sodium borohydride. The mixture is refluxed for 2 hours, concentrated under vacuum, diluted with water and filtered. The product, collected by filtration and crystallized from ethyl ether, yields 0.91 part 3-(2'-S-tetrahydropyranyloxy)-estra-1,3,5(10) - triene - 17β-ol, M.P. 154.5–156° C.; $[\alpha]_D = -26°$ (c.=1% in $CHCl_3$).

EXAMPLE 4

3 parts crude 3-(2'-tetrahydropyranyloxy)-estra - 1,3,5 17β-ol-17-acetate 3 parts crude 3-(2'-tetrahydropyranylovy)-estra - 1,3,5 (10)-triene-17β-ol (the mixture of the two disastereoisomers), which is obtained as a by-product in Example 1 (see also U.S. Patent 3,134,771, May 26, 1964, Examples 8, 9) is dissolved in 8 parts pyridine and combined with 4 parts acetic anhydride. After one night at room temperature, it is diluted with water and the crystallized product is filtered out (3.1 parts). This product 3-(2'-tetrahydropyranyloxy)-estra-1,3,5(10)-triene-17β-ol - 17 - acetate (a mixture of the two α- and β-anomers) is dissolved in 8 parts ethyl ether and allowed to be adsorbed on a column of 120 g. activated alumina II according to Beckman. By eluting with petroleum ether-benzene, 1.2 parts of a product is obtained, which, by crystallization from hexane, yields 0.92 part pure 3-(2'-S-tetrahydropyranyloxy)-estra-1,3,5(10)-triene-17β-ol-17-acetate, M.P. 104–105° C.; $[\alpha]_D = -49°$ (c.=1% in $CHCl_3$).

EXAMPLE 5

3-(2'-S-tetrahydropyranyloxy)-estra-1,3,5(10)-triene-17β-ol-17-propionate 1.5 parts 3 - (2'-S - tetrahydropyranyloxy) - estra - 1,3,5 (10)-triene-17β-ol is dissolved in 6 parts pyridine and combined with 3 parts propionic anhydride. The reaction mixture is held overnight at room temperature, then diluted with water and filtered. The product, which is collected on the filter, is crystallized from methanol, diluted to give 1.51 parts 3-(2'-S - tetrahydropyranyloxy) - estra-1,3,5(10)-triene-17β-ol-17-propionate at M.P. 96–97° C.; $[\alpha]_D = -39°$ (c.=1% in $CHCl_3$). Cotton effect, negative in ORD.

EXAMPLE 6

3-(2'-S-tetrahydropyranyloxy)-estra-1,3,5(10)-triene-17β-ol-17-valerate

Starting with 2 parts 3-(2'-S-tetrahydropyranyloxy)-estra-1,3,5(10)-triene-17β-ol and by operating as in the preceding example, but with valeric anhydride, after steam distillation of the reaction mixture, extraction with ether and percolation through an alumina column (hexane as the eluent), there is obtained 1.65 parts 3-(2'-S-tetrahydropyranyloxy)-estra-1,3,5(10)-triene-17β-ol - 17 - valerate, an oily product; $[\alpha]_D = -32°$ (c.=1% in $CHCl_3$).

EXAMPLE 7

3-(2'-S-tetrahydropyranyloxy)-estra-1,3,5(10)-triene-17β-ol-17-enantate

By operating as in the preceding example, but with enantic anhydride, there is obtained 1.72 parts 3-(2'-S-tetrahydropyranyloxy)-estra-1,3,5(10)-triene-17β-ol - 17-enantate, an oily product; $[\alpha]_D = -31°$ (c.=1% in $CHCl_3$).

EXAMPLE 8

3-(2'-S-tetrahydropyranyloxy)-estra-1,3,5(10)-triene-17β-ol-17-cyclopentylpropionate By operating as in Example 6, but with cyclopentylpropionic acid chloride, there is obtained 1.21 parts 3-(2'-S-tetrahydropyranyloxy)-estra-1,3,5(10) - triene - 17β-ol-17-cyclopentylpropionate; $[\alpha]_D = -25°$; (c.=1% in $CHCl_3$).

EXAMPLE 9

3-(2'-S-tetrahydropyranyloxy)-17α-methyl-estra-1,3,5(10)-triene-17β-ol

To a suspension of 5.4 parts of the sodium derivative of 17α-methyl-estra-1,3,5(10)-triene-3,17β-diol in dry benzene, a solution of 2.2 parts D,L-2-chlorotetrahydropyran in 15 parts benzene is added under stirring. This is held under stirring for 4 hours, then filtered and the benzene solution, after repeated washing with alkali and with water to neutrality, is evaporated to dryness to yield a residue of 2.4 parts 3-(2'-tetrahydropyranyloxy)-17α-methylestra-1,3,5(10)-triene-17β-ol (the mixture of the 2 anomers); $[\alpha]_D = +46°$; (c.=1% in $CHCl_3$).

By column chromatography through alumina, from the 1:1 and 3:4 petroleum ether:benzene fractions, 0.35 part pure 3-(2'-S-tetrahydropyranyloxy) - 17α - methyl-estra-1,3,5(10) - triene - 17β - ol; $[\alpha]_D = -37°$; (c.=1% in $CHCl_3$) have been isolated. Cotton effect, negative in ORD.

EXAMPLE 10

3-(2'-S-tetrahydropyranyloxy)-estra-1,3,5(10)-triene-16α,17β-diol

To a solution of 6 parts estra-1,3,5(10)-triene-3,16α,17β-triol in 25 parts dry dimethylformamide and 25 parts benzene, 10 parts finely powdered silver carbonate and successively, under stirring, 2.5 parts d,1,2-chlorotetrahydropyran are added. The mixture is held under stirring and in the dark for 15 hours, then filtered, and, after dilution with 100 parts benzene, extracted repeatedly with alkali and washed with water. Then, it is dried over sodium sulfate, evaporated to dryness to obtain 1.8 parts 3 - (2'-tetrahydropyranyloxy)-estra-1,3,5(10-triene-16α,17β-diol; $[\alpha]_D = +55°$; (c.=1% in $CHCl_3$), a mixture of the two anomers. The mixture is crystallized from ethyl ether and the precipitated solid is discarded. The dried mother liquors (0.9 part) are chromatographed through alumina (benzene-ethyl ether as the eluent) and from the 9:1 and 7:3 fractions, by repeated crystallizations from acetone-ether, there is obtained 0.18 part 3-(2'-S-tetrahydropyranyloxy) - estra-1,3,5(10)-triene-16α, 17β-diol; $[\alpha]_D = -29°$; (c.=1% in $CHCl_3$).

EXAMPLE 11

3-(2'-S-tetrahydropyranyloxy)-17α-ethynyl-estra-1,3,5(10)-triene-17β-ol

A solution of 1.5 parts 3-(2'-S-tetrahydropyranyloxy)-estra-1,3,5(10)-triene-17-one in a mixture of 14 parts toluene and 120 parts dry ethyl ether, is deaerated by passing a nitrogen current through it for 20 minutes at the temperature of 0° C.

The solution is then saturated with acetylene, and then 23 parts of a 13% potassium tert-butylate solution in butanol is added, during 15 minutes, the acetylene current through the mixture being maintained for 8 hours; and the mixture is thereafter stored for 5 days at —5° C.

The formed precipitate is collected by filtration, washed on the filter with 10 parts dry ether, dried under vacuum, treated with a 12% NH₄Cl solution in water.

The separated product is collected by filtration, washed with water to neutrality and then recrystallized from diluted methanol : 1.25 parts 3-(2'-S-tetrahydropyranyloxy)-17α-ethynyl-estra-1,3,5(10)-triene-17α-ol, having a M.P. of 99–101° C. and $[α]_D = -78°$; (c.=1% in CHCl₃) is obtained.

EXAMPLE 12

3-(2'-S-tetrahydropyranyloxy)-17α-vinyl-estra-1,3,5(10)-triene-17β-ol 1.2 parts 3-(2'-S-tetrahydropyranyloxy)-17α-ethynyl-estra-1,3,5(10)-triene-17β-ol (see Example 11) is dissolved in 8.5 parts pyridine and 7.5 parts dioxane. There is added 0.65 part Pd 2% on calcium carbonate, and hydrogen is passed up to the absorption of one molar equivalent of H₂. The catalyst is then filtered off, the solution evaporated to dryness and by crystallization from aqueous methanol, 0.96 part 3-(2'-S-tetrahydropyranyloxy)-17α-vinyl-estra-1,3,5(10)-triene-17β-ol; $[α]_D = -37°$; (c.=1% in CHCl₃) is obtained.

EXAMPLE 13

3-(2'-S-tetrahydropyranyloxy)-17α-ethyl-estra-1,3,5(10)-triene-17β-ol 2 parts 3-(2'-S-tetrahydropyranyloxy)-17α-ethynyl-estra-1,3,5(10)-triene-17β-ol is dissolved in 25 parts 95% ethanol and hydrogenated in the presence of 1 part Pd 5% on calcium carbonate. The catalyst is filtered off, the filtrate is concentrated to a small volume, and diluted with water. There is obtained 1.82 parts 3-(2'-S-tetrahydropyranyloxy)-17α-ethyl-estra-1,3,5(10)-triene-17β-ol; $[α]_D = -33°$; (c.=1% in CHCl₃). Cotton effect, negative in ORD.

EXAMPLE 14

17α-methyl-estra-1,3,5(10)-triene-bis-[3-(2'-S),17β(2'')-tetrahydropyranyloxy]

A solution of 0.06 part p-toluenesulfonic acid in benzene is added to a solution of 2.6 parts 3-(2'-S-tetrahydropyranyloxy)-17α-methyl-estra-1,3,5(10)-triene-17β-ol (see Example 9) containing 0.9 part 2,3-dihydropyran.

The mixture is maintained for 12 hours at room temperature, then it is neutralized with a sodium methylate solution, washed with water to neutrality and evaporated to dryness.

By crystallization from ethyl ether-methanol, there is obtained 2.2 parts 17α-methyl-estra-1,3,5(10)-triene-bis-[3-(2'-S), 17β(2'')-tetrahydropyranyl ether]; M.P. 101–104° C.; $[α]_D = -38°$ C. (c.=1% in CHCl₃).

EXAMPLE 15

17α-ethynyl-estra-1,3,5(10)-triene-bis-[3-(2'-S), 17β(2'')-tetrahydropyranyloxy]

By operating at 0° C., 2 parts 3-(2'-S-tetrahydropyranyloxy) - 17α - ethynyl-estra-1,3,5(10)-triene-17β-ol are dissolved in 10 parts 2,3-dihydropyran and combined with 0.025 part POCl₃.

After 12 hours at 2–5° C., the mixture is diluted with 200 parts ethyl ether, and the organic phase is washed with a 5% NaHCO₃ solution and with water.

Then, it is evaporated to dryness and crystallized from ethyl ether to obtain 1.73 parts 17α-ethynyl-estra-1,3,5(10) - triene - bis-[3(2'-S)-17β(2'')-tetrahydropyranyloxy]; M.P. 140–146° C.; $[α]_D = -46°$ (c.=1% in CHCl₃).

EXAMPLE 16

Estra-1,3,5(10)-triene-bis-[3(2'-S)-17β(2'')-tetrahydropyranyloxy]

A solution of 0.01 part p-toluenesulfonic acid in 5 parts benzene and 0.4 part 2,3-dihydropyran are added to a solution of 1 part 3-(2'-S-tetrahydropyranyloxy)-estra-1,3,5(10)-triene-17β-ol in 10 parts benzene, while cooling to +5° C. The mixture is held at 5° C. for 6 hours, neutralized with sodium methylate, washed with water to neutrality, and evaporated to dryness, to obtain, after percolation through an alumina column, 0.66 part of a waxy compound which is estra-1,3,5(10)-triene-bis-[3-(2'-S), 17β(2'')-tetrahydropyranyloxy]; $[α]_D = -32°$ (c.=1% in CHCl₃).

We claim:

1. 3 - (2' - S - tetrahydropyranyloxy)-estra-1,3,5(10)-triene β-anomer substituted at the 17 carbon atom by the grouping

wherein R₁ is hydroxy, acyloxy or tetrahydropyranyloxy and R₂ is hydrogen, methyl, ethyl, vinyl or ethynyl or R₁ and R₂ together are keto, the acyl radical of said acyloxy group being derived from a saturated aliphatic carboxylic acid of 1 to 8 carbon atoms, cyclopentylpropionic acid, cyclohexylpropionic acid, benzoic acid, phenylacetic acid, phenylpropionic acid, phenylcinnamic acid or phenylpropiolic acid, said β-anomer being in substantially pure form and being substantially free from the corresponding 3 - (2'-R-tetrahydropyranyloxy)-estra-1,3,5(10)-triene α-anomer.

2. The compound of claim 1 wherein the β-anomer is 3 - (2'S-tetrahydropyranyloxy) - estra - 1,3,5(10)-triene-17β-ol.

3. The compound of claim 1 wherein the β-anomer is 3 - (2'S-tetrahydropyranyloxy) - estra - 1,3,5(10)-triene-17-one.

4. The compound of claim 1 wherein the β-anomer is 3 - (2'S-tetrahydropyranyloxy) - estra - 1,3,5(10)-triene-17β-ol-17-acetate.

5. The compound of claim 1 wherein the β-anomer is 3 - (2'S-tetrahydropyranyloxy) - estra - 1,3,5(10)-triene-17β-ol-17-propionate.

6. The compound of claim 1 wherein the β-anomer is 3 - (2'S-tetrahydropyranyloxy) - estra - 1,3,5(10)-triene-17β-ol-17-valerate.

7. The compound of claim 1 wherein the β-anomer is 3 - (2'S-tetrahydropyranyloxy) - estra - 1,3,5(10)-triene-17β-ol-17-enantate.

8. The compound of claim 1 wherein the β-anomer is 3 - (2'S-tetrahydropyranyloxy) - estra - 1,3,5(10)-triene-17β-ol-17-cyclopentylpropionate.

9. The compound of claim 1 wherein the β-anomer is 3 - (2'S-tetrahydropyranyloxy) - estra - 1,3,5(10)-triene-17β-ol-17-benzoate.

10. The compound of claim 1 wherein the β-anomer is 3 - (2'S-tetrahydropyranyloxy) - estra - 1,3,5(10)-triene-17β-ol-17-phenylpropionate.

11. The compound of claim 1 wherein the β-anomer is 3 - (2'S-tetrahydropyranyloxy) - 17α - methyl - estra-1,3,5(10)-triene-17β-ol.

12. The compound of claim 1 wherein the β-anomer is 3 - (2'S - tetrahydropyranyloxy) - estra - 1,3,5(10)-triene-16α,17β-diol.

13. The compound of claim 1 wherein the β-anomer is 3 - (2'S - tetrahydropyranyloxy) - 17α - ethynyl - estra-1,3,5(10)-triene-17β-ol.

14. The compound of claim 1 wherein the β-anomer is 3 - (2'S - tetrahydropyranyloxy) - 17α - vinyl - estra-1,3,5(10)-triene-17β-ol.

15. The compound of claim 1 wherein the β-anomer is 3 - (2'S-tetrahydropyranyloxy) - 17α - ethyl - estra-1,3,5(10)-triene-17β-ol.

16. The compound of claim 1 wherein the β-anomer is 17α - methyl - estra - 1,3,5(10) - triene - bis-[3-(2'-S), 17β(2")-tetrahydropyranyloxy].

17. The compound of claim 1 wherein the β-anomer is 17α - ethynyl - estra - 1,3,5(10) - triene - bis-[3-(2'-S), 17β-(2")-tetrahydropyranyloxy].

18. The compound of claim 1 wherein the β-anomer is estra - 1,3,5(10) - triene - bis - [3(2'-S), 17β(2")-tetrahydropyranyloxy].

References Cited

UNITED STATES PATENTS

| | | | |
|---|---|---|---|
| 2,874,173 | 2/1959 | Hogg et al. | 260—397.45 |
| 3,134,771 | 5/1964 | de Ruggieri et al. | 260—239.55 |

OTHER REFERENCES

Gandolfi et al., Gazz. Chim. Ital. 94, June 1964, pp. 675–94, 681 and 690, relied upon.

Gardi et al., Gazz. Chim. Ital. 93, August 1963, pp. 1028–1043, 1035 relief upon.

de Ruggieri et al., J.A.C.S. 81, November 1959, pp. 5725–5727, 5725, relied upon.

ELBERT L. ROBERTS, Primary Examiner

U.S. Cl. X.R.

260—999